United States Patent
DiValentin et al.

(10) Patent No.: US 9,973,522 B2
(45) Date of Patent: May 15, 2018

(54) IDENTIFYING NETWORK SECURITY RISKS

(71) Applicant: Accenture Global Solutions Limited, Dublin (IE)

(72) Inventors: Louis William DiValentin, Fairfax, VA (US); Matthew Carver, Washington, DC (US)

(73) Assignee: Accenture Global Solutions Limited, Dublin (IE)

( * ) Notice: Subject to any disclaimer, the term of this patent is extended or adjusted under 35 U.S.C. 154(b) by 0 days. days.

(21) Appl. No.: 15/206,005

(22) Filed: Jul. 8, 2016

(65) Prior Publication Data

US 2018/0013777 A1 Jan. 11, 2018

(51) Int. Cl.
| | | |
|---|---|---|
| *H04L 29/06* | (2006.01) | |
| *G06F 17/30* | (2006.01) | |
| *G06F 21/57* | (2013.01) | |
| *G06Q 10/06* | (2012.01) | |
| *G06F 21/60* | (2013.01) | |

(52) U.S. Cl.
CPC .... *H04L 63/1425* (2013.01); *G06F 17/30958* (2013.01); *G06Q 10/0635* (2013.01); *G06F 21/577* (2013.01); *G06F 21/604* (2013.01); *G06F 2221/2141* (2013.01)

(58) Field of Classification Search
CPC ..... H04L 63/101; H04L 63/104; H04L 63/14; H04L 63/1425; H04L 63/1433; G06F 17/30958; G06F 21/57; G06F 21/577; G06F 2221/2141; G06Q 10/0365
USPC .......................................................... 726/25
See application file for complete search history.

(56) References Cited

U.S. PATENT DOCUMENTS 6,772,350 B1 * 8/2004 Belani ................... H04L 63/101
  707/999.009
7,490,356 B2 * 2/2009 Lieblich ................ G06F 21/316
  379/93.02

(Continued)

FOREIGN PATENT DOCUMENTS

EP 2884715 6/2015

OTHER PUBLICATIONS

Mathew, S., et al., Insider Abuse Comprehension Through Capability Acquisition Graphs, 11th International Conference on Information Fusion, 2008, 8 pages, [retrieved on Feb. 17, 2018], Retrieved from the Internet: <URL:http://ieeexplore.ieee.org/>.*

(Continued)

*Primary Examiner* — Geoffrey St Leger
(74) *Attorney, Agent, or Firm* — Fish & Richardson P.C.

(57) ABSTRACT

Methods, systems, and apparatus, including computer programs encoded on computer storage media, for identifying network security risks. One of the methods includes receiving organizational hierarchy data and receiving access privilege data for a network, generating an adjacency matrix that represents connections between individuals within the organizational hierarchy and various groups, and that represents connections between the individuals and various access privileges, selecting an analytic technique for analyzing the adjacency matrix, determining, for each individual, an individual score that represents a security risk associated with the individual's network account, and in response to determining that the individual score meets a threshold, applying security controls.

17 Claims, 5 Drawing Sheets

(56) References Cited

U.S. PATENT DOCUMENTS

| | | | | |
|---|---|---|---|---|
| 8,359,652 | B2* | 1/2013 | Bhagwan | G06F 21/604 726/1 |
| 8,560,363 | B1* | 10/2013 | Slocum | G05B 15/02 705/7.12 |
| 9,137,263 | B2* | 9/2015 | Chari | H04L 63/102 |
| 9,749,347 | B2* | 8/2017 | Pinney Wood | H04L 63/1433 |
| 2006/0075503 | A1* | 4/2006 | Bunker | G06F 11/324 726/25 |
| 2006/0191012 | A1 | 8/2006 | Banzhof et al. | |
| 2006/0242711 | A1* | 10/2006 | Anzai | G06F 21/577 726/25 |
| 2008/0052514 | A1 | 2/2008 | Nakae | |
| 2008/0189154 | A1* | 8/2008 | Wainwright | G06Q 10/06 705/7.28 |
| 2009/0106207 | A1 | 4/2009 | Solheim et al. | |
| 2009/0125973 | A1* | 5/2009 | Byers | H04L 63/1433 726/1 |
| 2011/0125548 | A1* | 5/2011 | Aharon | G06Q 10/04 705/7.28 |
| 2013/0239217 | A1* | 9/2013 | Kindler | G06F 17/30958 726/25 |
| 2013/0246119 | A1* | 9/2013 | Slaughenhoupt | G06Q 10/06 705/7.27 |
| 2014/0164073 | A1* | 6/2014 | Mosley | G06Q 10/06398 705/7.42 |
| 2014/0173684 | A1* | 6/2014 | McQuay | H04L 63/20 726/1 |
| 2014/0289323 | A1* | 9/2014 | Kutaragi | G06Q 50/01 709/203 |
| 2015/0310195 | A1 | 10/2015 | Bailor | |
| 2016/0012235 | A1* | 1/2016 | Lee | G06Q 10/0635 726/25 |
| 2016/0065608 | A1* | 3/2016 | Futty | H04L 63/1433 726/25 |
| 2016/0080224 | A1* | 3/2016 | Baikalov | H04W 4/08 345/440 |
| 2016/0330236 | A1* | 11/2016 | Reddy | H04L 63/1466 |
| 2016/0335356 | A1* | 11/2016 | Desineni | G06F 17/30156 |
| 2017/0118239 | A1* | 4/2017 | Most | H04L 63/1433 |

OTHER PUBLICATIONS

Motiee, S., et al., Do windows users follow the principle of least privilege? Investigating user account control practices, Proceedings of the Sixth Symposium on Usable Privacy and Security, Jul. 14-16, 2010, 13 pages, [retrieved on Feb. 17, 2018], Retrieved from the Internet: <URL:http://dl.acm.org/>.*

European Extended Search Report for Application No. 17180332.3, dated Sep. 9, 2017, 8 pages.

Graph Databases in the Enterprise: Identity & Access Management—Neo4j Graph Database [online], [retrieved on Jun. 22, 2016]. Retrieved from the Internet: htttps://neo4j.com/blog/enterpriseidentityaccessmanagement/, Jun. 22, 2016, 8 pages.

HP Arcsight Express: Powered by the Corr-Engine, Security and Compliance Monitoring for Complex CyberAttacks, HP Enterprise Security Project Brief, Copyright 2011 Hewlett-Packard Development Company, L.P., ESP-PRB005-092109-19, 3 pages.

Arcsight Identityview, Adding User Context to Security Monitoring, HP Enterprise Security Project Brief, Copyright 2011 Hewlett-Packard Development Company, L.P., ESP-PRB018-072610-03, 2 pages.

"ArcSight Express: World-Class Protection for the Mid-Size Organization, Research 013-040109-01," Whitepaper, ArcSight, Inc., © 2010, 6 pages.

Australian Office Action in Australian Application No. 2017204597, dated Jan. 29, 2018, 4 pages.

* cited by examiner

| | A | B | C | G1 | G2 | P1 |
|---|---|---|---|---|---|---|
| A | 0 | 0 | 0 | x | 0 | 0 |
| B | 0 | 0 | 0 | x | x | x |
| C | 0 | 0 | 0 | 0 | x | x |
| G1 | x | x | 0 | 0 | 0 | 0 |
| G2 | 0 | x | x | 0 | 0 | 0 |
| P1 | 0 | x | x | 0 | 0 | 0 |

| | A | B | C | G1 | G2 | P1 |
|---|---|---|---|---|---|---|
| A | 0 | 0 | 0 | 9 | 0 | 0 |
| B | 0 | 0 | 0 | 9 | 1 | 5 |
| C | 0 | 0 | 0 | 0 | 1 | 5 |
| G1 | 9 | 9 | 0 | 0 | 0 | 0 |
| G2 | 0 | 1 | 1 | 0 | 0 | 0 |
| P1 | 0 | 5 | 5 | 0 | 0 | 0 |

| | A | B | C | G2 |
|---|---|---|---|---|
| A | 0 | 9 | 0 | 0 |
| B | 9 | 0 | 5 | 1 |
| C | 0 | 5 | 0 | 1 |
| G2 | 0 | 1 | 1 | 0 |

IDENTIFYING NETWORK SECURITY RISKS

BACKGROUND

The present disclosure relates to security and network operations.

SUMMARY

In general, one innovative aspect of the subject matter described in this specification can be embodied in methods for identifying network security risks, including receiving organization data that represents a plurality of individuals in an organizational hierarchy of an organization and that indicates, for each individual of the plurality of individuals, one or more groups to which the individual belongs. The method also includes receiving access privilege data that indicates, for each individual of the plurality of individuals, one or more access privileges that have been assigned to the individual for network resources, and generating an adjacency matrix that represents connections between the plurality of individuals and the one or more groups, and that represents connections between the plurality of individuals and the one or more access privileges. The method also includes selecting an analytic technique for analyzing the adjacency matrix. Based on applying the selected analytic technique, for each individual of the plurality of individuals, the method includes determining an individual score that represents a security risk associated with a network account of the individual, determining, for a particular individual, that the individual score meets a predetermined threshold, and in response to the determining that the individual score meets a predetermined threshold, applying one or more security controls to the network account of the particular individual.

Other embodiments of this aspect include corresponding computer systems, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments may each optionally include one or more of the following features. The one or more groups to which the individual belongs can include one or more of a project to which the individual is assigned, a department to which the individual is assigned, or a manager to which the individual is assigned. The generated adjacency matrix can be modified, including, for at least one of the one or more groups or access privileges, replacing a star network for the group or access privilege with a mesh network between individuals associated with the group or access privilege, and removing the group or access privilege from the adjacency matrix. For at least one of the groups, a group score can be determined that represents a criticality of the group within the organization, and modifying the generated adjacency matrix can include replacing a value that indicates a connection between an individual and the group with the determined group score. The group score can be based at least in part on sensitivity of data to which individuals that belong to the group have access privileges. For at least one of the access privileges, an access privilege score can be determined that represents an access privilege risk associated with potential misuse of the access privilege, and modifying the generated adjacency matrix can include replacing a value that indicates a connection between an individual and the access privilege with the determined access privilege score. A graph can be generated based on the adjacency matrix. Individuals, groups, and access privileges in the adjacency matrix can be represented as nodes in the graph, and connections between individuals, groups, and access privileges can be represented as edges in the graph. Selecting the analytic technique can be based at least in part on attributes of the graph. A visualization of the generated graph can be generated. For each of the nodes that represent a corresponding individual, the node can be scaled to have a size that is proportional to an individual score of the corresponding individual. For each of the nodes that represent a corresponding individual, the node can be rendered with a color that is selected based at least in part on an individual score of the corresponding individual. One or more additional analytic techniques can be selected for analyzing the adjacency matrix, and the selected one or more additional analytic techniques can be applied. Determining the individual score for each of the plurality of individuals can include combining respective individual scores determined based on applying each of the selected analytic techniques. Combining respective individual scores can include weighting the individual scores based on the applied analytic technique. Applying the one or more security controls can include triggering an endpoint device to log activity associated with the account of the particular user.

Particular embodiments of the subject matter described in this specification may be implemented so as to realize one or more of the following advantages. A quantitative approach can be applied for identifying individual accounts within an organization that may be associated with potential network security risk. Data structures for representing connections between individuals in the organization's network can be collapsed, thus reducing data storage demands while simplifying visual renderings of the data structures. Appropriate security controls can be automatically applied to mitigate security risks to the organization's network.

The details of one or more implementations of the subject matter described in this specification are set forth in the accompanying drawings and the description below. Other potential features, aspects, and advantages of the subject matter will become apparent from the description, the drawings, and the claims.

DETAILED DESCRIPTION

This specification describes systems, methods, and computer programs for identifying network security risks. In general, identifying network security risks may include extracting data related to individuals in an organization, including organizational hierarchy data that indicates groups to which individuals may belong (e.g., based on project assignments, department assignments, and/or manager assignments), and including access privilege data that indicates access privileges to network resources that have been assigned to individuals. By mapping relationships between individuals, groups, and access privileges, appropriate analytical techniques can be applied for a quantitative approach to identifying individuals within the organization where relationships and access privileges converge. Accounts associated with the identified individuals may bear potential network security risks for the organization, as the accounts may become targets for network attackers to pivot from when maneuvering through the network during an attack (e.g., a spear phishing attack). In response to identifying potential network security risks to the organization's network, for example, appropriate security controls can be applied to mitigate the security risks, to prevent damage to network resources, and/or to secure the organization's information.

Figure 1:
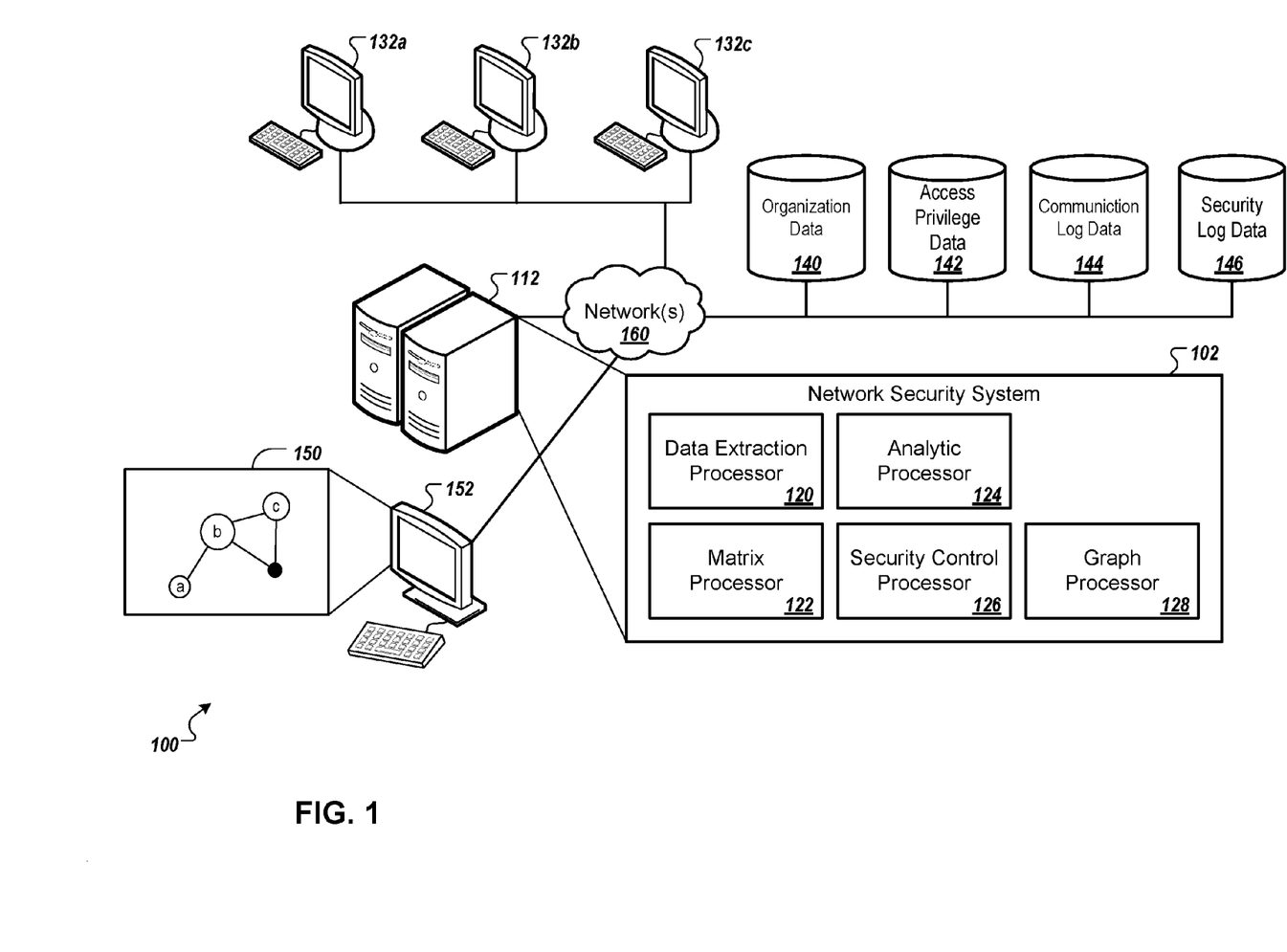
FIG. 1 depicts an example network security system that can execute implementations of the present disclosure.

FIG. 1 depicts an example system 100 that can execute implementations of the present disclosure. As shown in FIG. 1, the example system 100 includes a network security system 102. The network security system 102, for example, can be implemented using one or more computing server(s) 112. In some examples, the computing server(s) 112 can represent various forms of servers, including, but not limited to a network server, a web server, an application server, or a server farm. The computing server(s) 112 may be configured to execute application code associated with a variety of software components (e.g., modules, objects, libraries, services, etc.) and/or hardware components, including a data extraction processor 120, a matrix processor 122, an analytic processor 124, a security control processor 126, and a graph processor 128. Two or more of the components 120-128 may be implemented on the same computing device, or on different devices, such as devices included in a computer network, a peer-to-peer network, or on a special purpose computer or special purpose processor. Operations performed by each of the components 120-128 may be performed by a single computing device, or may be distributed to multiple devices.

The example system 100 can include a variety of computing devices (e.g., computing devices 132a, 132b, and 132c) used by individuals within an organization's network. The computing devices 132a-c, for example, may be any suitable type of computing device (e.g., laptop or desktop computer, tablet computer, smartphone, personal digital assistant, or other stationary or portable device). Among other components, for example, the computing devices 132a-c can include one or more processors, computer readable media that store software applications, input device(s) (e.g., touch screens, keyboards, computer mice, motion sensors, microphones, etc.), output device(s) (e.g., display screens, speakers, etc.), and communications interfaces.

Various data sources (e.g., databases, file systems, etc.) may maintain data used by the example system 100 and its components. For example, the system 100 includes an organization data source 140, an access privilege data source 142, a communication log data source 144, and a security log data source 146. The data sources 140-146, for example, can implement databases, file systems, and the like to add, remove, and maintain data used by the system 100. For example, the network security system 102 can receive and analyze data from the data sources 140-146 to identify network security risks associated with use of the computing devices 132a-c. Upon identifying networks security risks, for example, the network security system 102 can apply security controls to one or more of the computing devices 132a-c, and/or can generate one or more visualizations 150 of the network security risks for presentation (e.g., by presentation device 152) to a network administrator or data scientist.

The computing server(s) 112, the computing devices 132a-c, the data sources 140-146, and the presentation device 152 included in the example system 100 can communicate over one or more networks 160. The network(s) 160 may include a local area network (LAN), a WiFi network, a mobile telecommunications network, an intranet, the Internet, or any other suitable network or any appropriate combination thereof.

Figure 2:
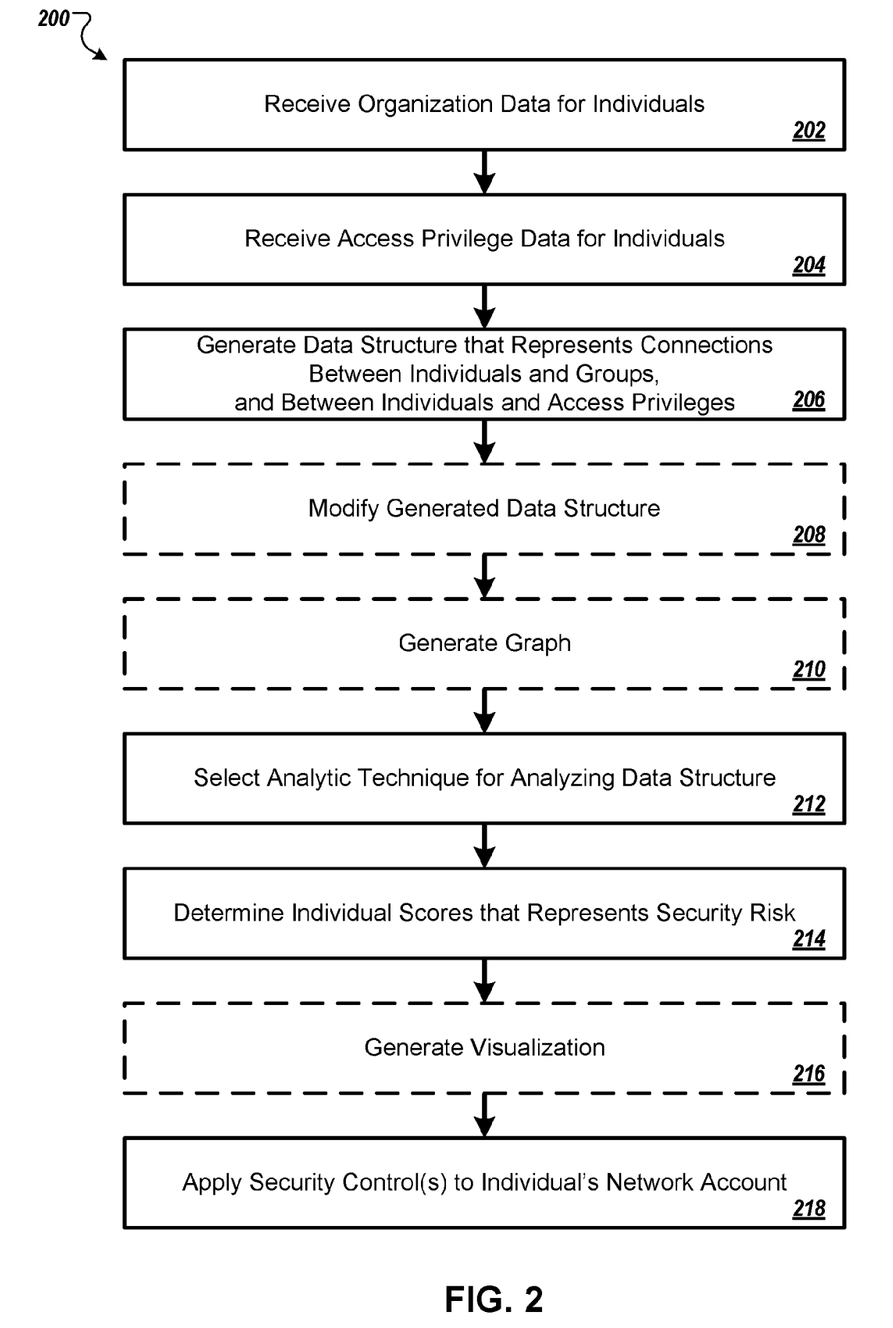
FIG. 2 depicts an example process that can be executed in accordance with implementations of the present disclosure.

FIG. 2 depicts an example process 200 that can be executed in accordance with implementations of the present disclosure. In general, the example process 200 can be used for identifying network security risks, for providing information related to the network security risks, and for applying appropriate network security controls. The example process 200 can be implemented, for example, by the example environment 100 (shown in FIG. 1), and will be described as such for the purpose of clarity.

Organization data for individuals in an organization can be received (202). For example, the network security system 102 can use the data extraction processor 120 to retrieve information from the organization data source 140. To retrieve the information, for example, the data extraction processor 120 can query the organization data source 140 (e.g., a directory service that defines relationships between individuals within the organization) using a script that specifies fields (e.g., user name, organizational field(s)) to be retrieved. In general, the organization data represents individuals in an organizational hierarchy, and can include data that indicates, for each individual, one or more groups to which the individual belongs. Examples of groups to which individuals may belong may include projects to which individuals may be assigned, departments to which individuals may be assigned, managers to which individuals may be assigned, and other suitable organizational groups.

Access privilege data for individuals in an organization can be received (204). For example, the network security system 102 can use the data extraction processor 120 to retrieve information from the access privilege data source 142. To retrieve the information, for example, the data extraction processor 120 can query the access privilege data source 142 (e.g., a directory service that defines access privileges for individuals within the organization's network) using a script that specifies fields (e.g., user name, member of field(s)) to be retrieved. The access privilege data can include data that indicates, for each individual, one or more access privileges that have been assigned to the individual for network resources, such as databases, directories, files, or other network resources.

Figure 3A:
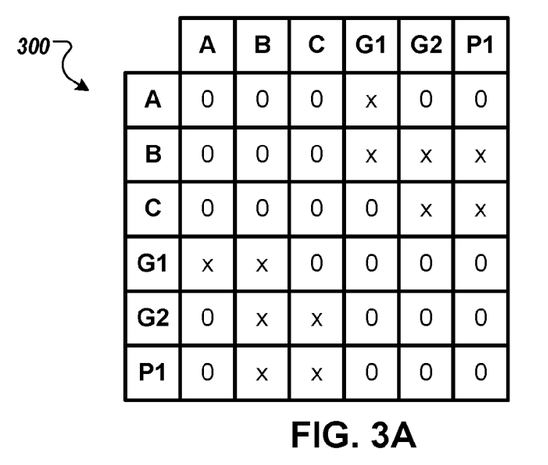
FIGS. 3A-3C depict example data structures that can be generated in accordance with implementations of the present disclosure.

A data structure can be generated that represents connections between individuals and groups, and between individuals and access privileges (206). For example, the network security system 102 can use the matrix processor 122 to generate an adjacency matrix, based at least in part on the data received from the organization data source 140 and the access privilege data source 142. In other examples, a different sort of data structure that maps individuals to organizational groups and to access privileges may be generated. Referring to FIG. 3A, an example adjacency matrix 300 is shown that maps Individual A, Individual B, and Individual C to various groups and access privileges. As shown in the adjacency matrix 300, for example, Individual A is shown as belonging to Group 1, Individual B is shown as belonging to Group 1 and Group 2, and as having Access Privilege 1, and Individual C is shown as belonging to Group 2 and as having Access Privilege 1. In other examples, the number of individuals, groups, and access privileges may be very large, possibly including many thousands of different individuals, and possibly including hundreds or thousands of different groups and access privileges.

In some implementations, the data structure that represents connections between users and groups, and between individuals and access privileges may be generated in response to one or more trigger conditions. For example, a trigger condition for generating the data structure may include a group change, such as adding individuals to or removing individuals from a project or department. As another example, the trigger condition may include an organizational hierarchy change, such as changing an individual's manager. As another example, the trigger condition may include an access privilege change, such as adding or removing an individual's access privilege. As another example, the trigger condition may be time-based, and the data structure may be periodically (e.g., daily, weekly, monthly) generated.

Optionally, the data structure may be modified (208). For example, the network security system 102 can use the matrix processor 122 to modify the generated example adjacency matrix 300. In general, modifying generated adjacency matrices can include, for at least one of the groups or access privileges, replacing a star network for the group or access privilege with a mesh network between individuals associated with the group or access privilege, and removing the group or access privilege from the adjacency matrix. As shown in the adjacency matrix 300, for example, individuals may be initially associated with groups and access privileges, based on organizational data and access privilege data. Individuals having one or more groups and/or access privileges in common, for example, may be subsequently linked. For example, individuals that have one or more inferred connections, such as individuals that have been assigned to the same project, that belong to the same department, that have the same manager, and/or that have access to the same shared network resource (e.g., a database, a directory, a file) may be linked to reflect the inferred connection(s). Upon linking the individuals, for example, the connecting group or access privilege may be removed from the data structure, as described below in regard to FIG. 3C.

In some implementations, connections between individuals in an organization may be determined directly. Referring again to FIG. 1, for example, the network security system 102 can use the data extraction processor 120 to retrieve information from the communication log data source 144. To retrieve the information, for example, the data extraction processor 120 can query the communication log data source 144 (e.g., an e-mail repository, a messenger repository, a repository of phone call records) using a script to retrieve a history of communications between individuals within the organization. A number of communication events between individuals can be determined over a particular time period (e.g., a week, a month, a year), for example, and individuals having a number of communication events that meets a threshold value (e.g., one, ten, twenty) may be linked. As another example, a link between individuals may be assigned a weight that is proportional to the number of communication events.

In some implementations, for at least one of the groups, a group score can be determined. The group score, for example, can represent a criticality of the group within the organization. For example, projects, departments, and/or managers may be rated based on a rating technique that accounts for factors such as importance within the organization, access to sensitive data, access to funding, and other suitable factors. Rating techniques, for example, may include rating groups on a scale (e.g., 1-10, Likert), and storing a rating value for each group for future reference by the Network Security System 102. Group scores derived from non-linear rating techniques (e.g., Likert) may normalized, for example, to occur on a linear scale (e.g., 1-10).

Figure 3B:
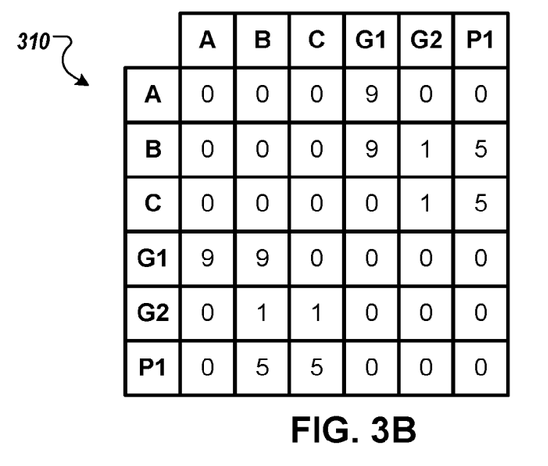

Modifying the generated adjacency matrix may include replacing a value that indicates a connection between an individual and a group with the determined group score for the group. Referring now to FIG. 3B, an example modified adjacency matrix 310 is shown. In the present example, Group 1 may be assigned a group score of nine (e.g., relatively high criticality), whereas Group 2 may be assigned a group score of one (e.g., relatively low criticality). As shown in the modified adjacency matrix 310, for example, the group score for Group 1 (e.g., a value of nine) is used to replace the value (e.g., "x") that indicates a connection between Group 1 and Individual A, and a connection between Group 1 and Individual B. In the present example, the group score for Group 2 (e.g., a value of one) is used to replace the value (e.g., "x") that indicates a connection between Group 2 and Individual B, and a connection between Group 2 and Individual C.

In some implementations, for at least one of the access privileges, an access privilege score can be determined. The access privilege score, for example, can represent an access privilege risk associated with potential misuse of the access privilege. For example, access privileges may be rated based on a system that accounts for factors such as potential damage to network resources associated with misuse of the access privilege, potential vulnerability of the organization's information associated with misuse of the access privilege, and other suitable factors. Rating techniques, for example, may include rating the groups on a scale (e.g., 1-10, Likert), and storing the rating value for each group for future reference by the Network Security System 102. Group scores derived from non-linear rating techniques (e.g., Likert) may normalized, for example, to occur on a linear scale (e.g., 1-10).

Modifying the generated adjacency matrix may include replacing a value that indicates a connection between an individual and an access privilege with the determined access privilege score for the access privilege. Referring again to FIG. 3B, the example modified adjacency matrix 310 is shown. In the present example, Access Privilege 1 may be assigned an access privilege score of five (e.g., a medium criticality). As shown in the modified adjacency matrix 310, for example, the access privilege score for Access Privilege 1 (e.g., a value of five) is used to replace the value (e.g., "x") that indicates a connection between Access Privilege 1 and Individual B, and a connection between Access Privilege 1 and Individual C.

Figure 3C:
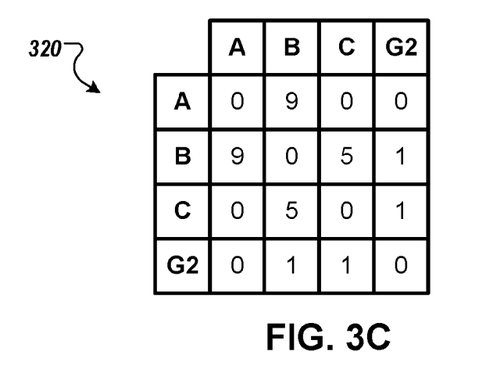

Referring to FIG. 3C, an example collapsed adjacency matrix 320 is shown. In the present example, the modified adjacency matrix 310 (shown in FIG. 3B) may be collapsed after replacing values that indicate connections between individuals and groups with group scores and/or replacing values that indicate connections between individuals and access privileges with access privilege scores. In other examples, the unmodified adjacency matrix 300 (shown in FIG. 3A) may be collapsed. As described above, collapsing the generated adjacency matrix can include, for at least one of the groups or access privileges, replacing a star network for the group or access privilege with a mesh network between individuals associated with the group or access privilege, and removing the group or access privilege from the adjacency matrix. In the present example, Group 1 and Access Privilege 1 are selected for removal from the modified adjacency matrix 310. Since both Individual A and Individual B belong to Group 1, for example, a connection is identified between the individuals, the individuals may be linked, and Group 1 may be removed. The group score for Group 1 (e.g., nine) may be retained in the collapsed adjacency matrix 320, as represented in the connection shown between Individual A and Individual B. Since both Individual B and Individual C have Access Privilege 1, for example, a connection is identified between the individuals, the individuals may be linked, and Access Privilege 1 may be removed. The access privilege score for Access Privilege 1 (e.g., five) may be retained in the collapsed adjacency matrix 320, as represented in the connection shown between Individual B and Individual C. In the present example, Group 2 is not removed from the modified adjacency matrix 310. In general, one or more groups and/or access privileges may be selected for inclusion in a collapsed adjacency matrix, or all groups and access privileges may be removed, as indicated by a system administrator or data scientist through an interface provided by a computing device, for example.

In some implementations, values in an adjacency matrix that indicate connections between individuals may be aggregated when the individuals belong to multiple shared groups and/or have multiple shared access privileges. For example, if Group 2 were to be removed from the modified adjacency matrix 310 (shown in FIG. 3B), the group score for Group 2 (e.g., one) may be retained in the collapsed adjacency matrix 320, and aggregated with other values that represent connections between individuals in the adjacency matrix 320. In the present example, since both Individual B and Individual C belong to Group 2, the group score for Group 2 (e.g., one) may be aggregated (e.g., added) with the access privilege score for Access Privilege 1 (e.g., five), and an aggregate score (e.g., six) may be retained in the collapsed adjacency matrix 320 to represent the connection between Individual B and Individual C. Through collapsing data structures that represent connections between individuals and groups, and between individuals and access privileges, data storage demands can be reduced (e.g., by aggregating thousands or millions of data points associated with individual/group and individual/access privilege connections) while simplifying the data structures for subsequent data processing and visual rendering.

Optionally, a graph of the data structure may be generated (210). Referring again to FIG. 1, for example, the network security system 102 can use the graph processor 128 to generate a graph 400 (shown in FIG. 4A) based on the modified and collapsed adjacency matrix 320 (shown in FIG. 3C). The graph 400 is shown as an undirected graph, however other examples may include directed graphs. In general, individuals, groups, and access privileges in an adjacency matrix may be represented as nodes in a graph, and connections between individuals, groups, and access privileges may be represented as edges in the graph. For example, Individual A may be represented as Node A, Individual B may be represented as Node B, Individual C may be represented as Node C, and Group 2 may be represented as Node G2. In the present example, a connection is shown between Individual A and Individual B, a connection is shown between Individual B and Individual C, and connections are shown between Group 2 and both Individual B and Individual C.

An analytic technique for analyzing the data structure can be selected (212). Referring again to FIG. 1, for example, the network security system 102 can use the analytic processor 124 to select an analytic technique. In general, selection of an analytic technique may be based at least in part on attributes of a generated graph. For example, the generated graph 400 (shown in FIG. 4A) may have particular attributes (e.g., shape characteristics) that are better suited for analysis by a particular analytic technique. Example analytic techniques that may be used for analyzing data structures (e.g., the collapsed adjacency matrix 320, shown in FIG. 3C) may include Betweenness Centrality, Katz Centrality, Eigenvector Centrality, Degree Centrality, Closeness Centrality, Triangle Counting, Percolation Centrality, Cross-Clique Centrality, and other suitable techniques.

Figure 4A:
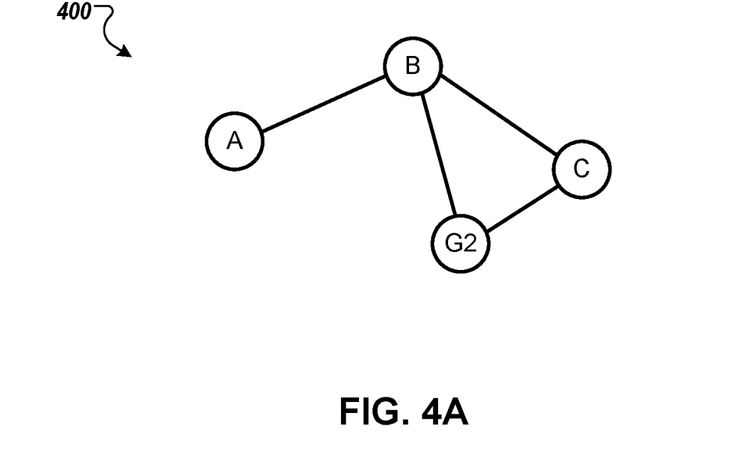
FIGS. 4A-4B depict example data representations that can be generated in accordance with implementations of the present disclosure.

In some implementations, the analytic processor 124 may be configured to include a mapping between graph attributes and analytic techniques, and a suitable analytic technique may be automatically selected using the mapping. For example, the analytic processor 124 can analyze the generated graph 400, identify various graph attributes, and select an analytic technique that is mapped to (e.g., has a best fit with) the graph attributes. A Betweenness Centrality analytic technique, for example, may be mapped to graphs that represent individual connections with highly scored projects. As another example, a Cross-Clique Centrality analytic technique may be mapped to graphs that represent many individual connections and lower scored projects. In some implementations, algorithm selection may be automated by starting from an ideal state of security risk within a network, and subsequently selecting an analytic method that minimizes deviation between the ideal state and an actual state of the network. A deviation score can be calculated, for example, based on minimizing a loss function (e.g., a sum of squares deviation or another suitable function) of expected vs. actual values.

In some implementations, a selection of a suitable analytic technique may be based at least in part on input received from a system administrator or data scientist. For example, learned knowledge can be represented in a framework for guidance in selection of a suitable analytic technique. For example, the network security system 102 can use the graph processor 128 to generate the visualization 150 of the generated graph 400, and a data scientist can select an appropriate analytic technique based on viewing the visualization 150.

Individual scores that represent security risk can be determined (214). For example, the network security system 102 can use the analytic processor 124 to apply the selected analytic technique to process data associated with the collapsed adjacency matrix 320 (shown in FIG. 3C). Based on applying the analytic technique, for example, an individual score can be determined for each individual represented in the adjacency matrix 320. The individual score may represent a security risk associated with a network account of the individual.

In some implementations, one or more additional analytic techniques may be selected for analyzing the data structure (e.g., adjacency matrix). The additional analytic techniques may be selected and applied by the analytic processor 124, for example. Determining the individual score for each individual may include combining respective individual scores determined based on applying each of the selected analytic techniques. For example, an ensemble modeling technique can include determining, for each individual represented in the collapsed adjacency matrix 320 (shown in FIG. 3C), a first individual score based on applying a first analytic technique, a second individual score based on applying a second technique, and so forth. A composite individual score can be determined for each individual, for example, by normalizing the scores generated by each of the selected analytic techniques to a single scale, and by combining the respective analytic scores for the individual. In some implementations, combining respective individual scores may include weighting the individual scores based on the applied analytic technique that generated the individual score. For example, scores generated by some analytic techniques may be weighed higher or lower than scores generated by other analytic techniques. In some cases, ensemble modeling techniques may generate better fitting individual scores than scores generated by any single analytic technique.

Figure 4B:
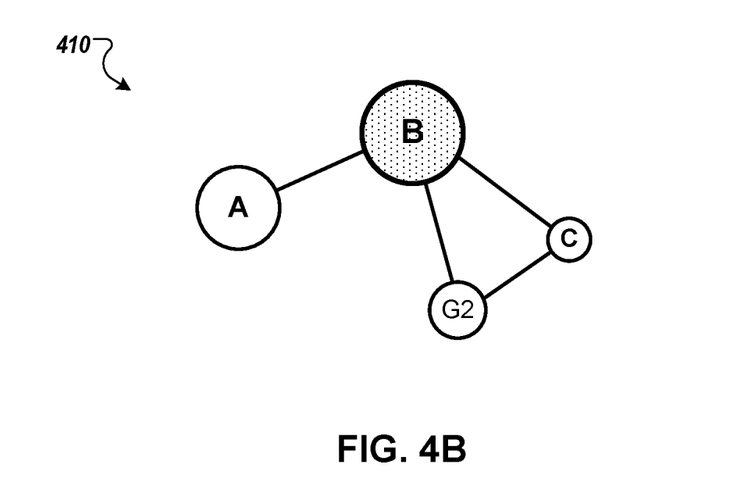

Optionally, a visualization of the graph of the data structure may be generated (216). For example, the network security system 102 can use the graph processor 128 to generate an updated visualization 410 (shown in FIG. 4B) of the generated graph 400 (shown in FIG. 4A) that visually accentuates particular nodes in the graph to emphasize potential security risks within the organization's network. The updated visualization 410 can be presented to a system administrator or data scientist by the presentation device 152, for example. As shown in the updated visualization 410, for example, for each of the nodes that represents an individual, the node may be scaled to have a size that is proportional to an individual score of the corresponding individual. In the present example, Individual B is associated with a high score, Individual A is associated with a lower score, and Individual C is associated with an even lower score. Thus, in the present example, Node B (e.g., corresponding to Individual B) may be scaled to be larger than Node A (e.g., corresponding to Individual A), which may be scaled to be larger than Node C (e.g., corresponding to Individual C). As another example, for each of the nodes in the generated graph that represents an individual, the node may be rendered with a color that is selected based at least in part on an individual score of the corresponding individual. For example, nodes of individuals having scores within a predetermined range may be rendered with a color that corresponds to that range. In the present example, Individual B is associated with a score in a high range of values, and corresponding Node B is rendered with a color that corresponds to the high range of values, whereas Individuals A and C are associated with scores in a lower range of values, and corresponding Nodes A and C are rendered with a color that corresponds to the lower range of values.

One or more security controls can be applied to an individual's network account (218). Referring again to FIG. 1, for example, the network security system 102 can use the security control processor 126 to determine, for a particular individual, that the individual score meets a predetermined threshold, and in response, to apply one or more security controls to a network account of the particular individual. For example, the individual score associated with Individual B may meet the threshold, indicating that one or more network accounts associated with Individual B may represent a potential security risk to the organization's network. The security control processor 126 can identify a network account of Individual B (e.g., an account accessed by use of the computing device 132b), and can apply appropriate security controls, for example. In some implementations, applying security controls may include triggering an endpoint device to log activity associated with the account of the particular user. For example, the security control processor 126 can trigger an application executed by the computing device 132b to log security data to the security log data store 146, or to increase an amount of logging to be performed. In some implementations, applying security controls may include automatically providing one or more security updates and/or security-related documents within a network. For example, the security control processor 126 can automatically deliver and install appropriate security updates on the computing device 132b. As another example, the security control processor 126 can automatically provide security training information to the computing device 132b.

In some implementations, security controls may be applied upon generating a new account for an individual. A new account can be created for an individual in an organization, for example, and network access privileges can be automatically generated for the individual's account, based on an organizational hierarchy relationship context. For example, an individual score can be determined for the individual based on the individual's connection with various groups, and the individual score can be used to assign appropriate privileges to the individual's account.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 5:
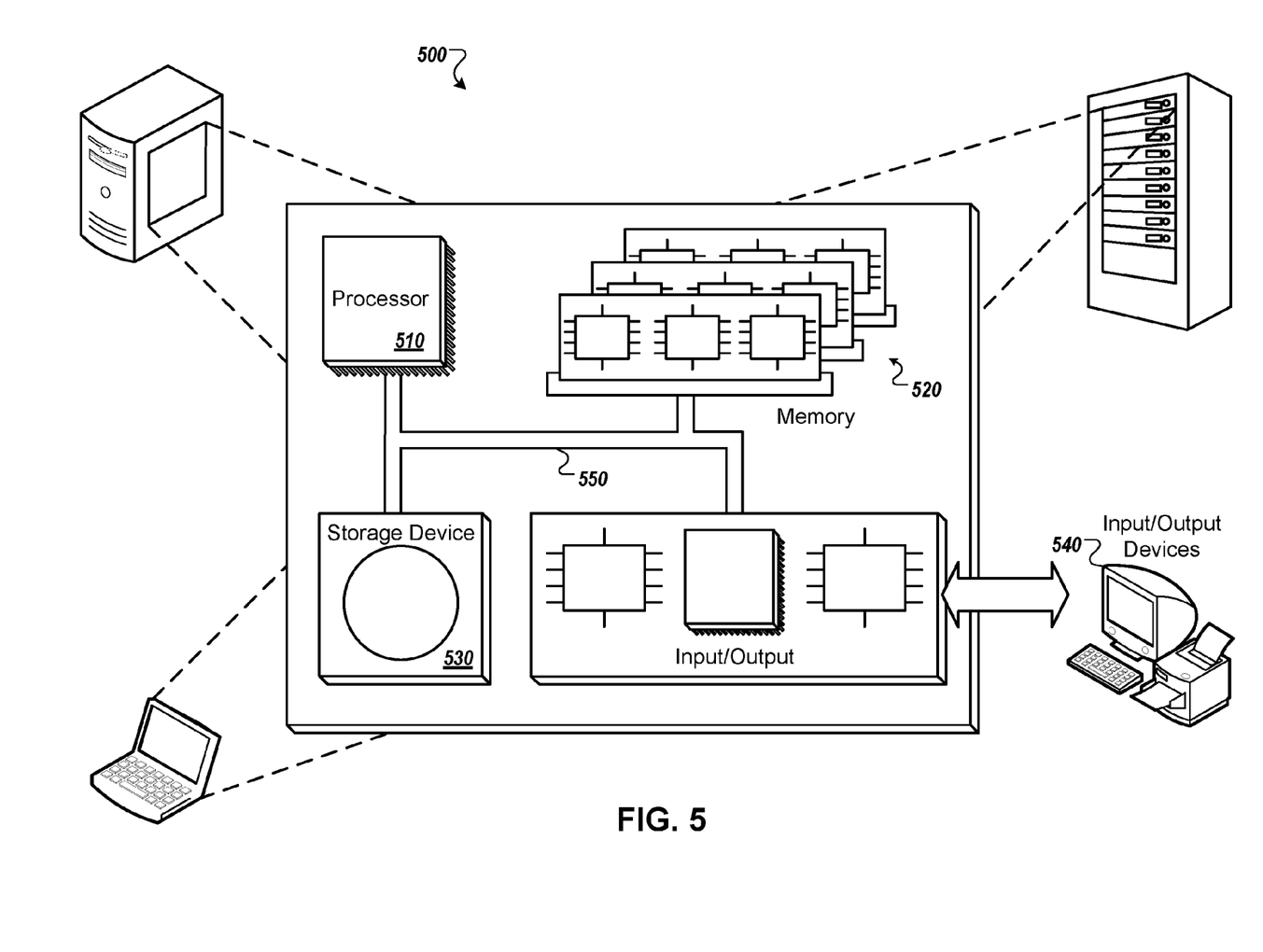
FIG. 5 is a block diagram of a computing system that can be used in connection with computer-implemented methods described in this document.

An example of one such type of computer is shown in FIG. 5, which shows a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for identifying network security risks, the method comprising:
   receiving organization data that represents a plurality of individuals in an organizational hierarchy of an organization, wherein the organization data includes data that indicates, for each individual of the plurality of individuals, one or more groups to which the individual belongs;
   for at least one of the groups, determining a group score that represents a criticality of the group within the organization;
   receiving access privilege data that indicates, for each individual of the plurality of individuals, one or more access privileges that have been assigned to the individual for network resources;
   for at least one of the access privileges, determining an access privilege score that represents an access privilege risk associated with potential misuse of the access privilege;
   generating an adjacency matrix that represents connections between the plurality of individuals and the one or more groups, and that represents connections between the plurality of individuals and the one or more access privileges, wherein a connection between an individual and the at least one of the groups is associated with the determined group score, and a connection between the individual and the at least one of the access privileges is associated with the determined access privilege score;
   selecting an analytic technique for analyzing the adjacency matrix;
   based on applying the selected analytic technique, for each individual of the plurality of individuals, determining an individual score that represents a security risk associated with a network account of the individual;
   determining, for a particular individual, that the individual score meets a predetermined threshold; and
   in response to the determining that the individual score meets a predetermined threshold, automatically applying, by a security control processor, one or more security controls to the network account of the particular individual, wherein applying the one or more security controls includes triggering an endpoint device to log activity associated with the network account of the particular individual.

2. The method of claim 1, wherein the one or more groups to which the individual belongs includes one or more of a project to which the individual is assigned, a department to which the individual is assigned, or a manager to which the individual is assigned.

3. The method of claim 1, wherein the access privilege data is received from a directory service that defines access privileges for individuals within a computing network associated with the organization.

4. The method of claim 1, further comprising modifying the generated adjacency matrix, wherein the modifying comprises:
   for at least one of the one or more groups or access privileges:
      replacing a star network for the group or access privilege with a mesh network between individuals associated with the group or access privilege; and
      removing the group or access privilege from the adjacency matrix.

5. The method of claim 1, wherein for at least one of the groups, the determined group score is based at least in part on sensitivity of data to which individuals that belong to the group have access privileges.

6. The method of claim 1, further comprising generating a graph based on the adjacency matrix, wherein individuals, groups, and access privileges in the adjacency matrix are represented as nodes in the graph, and connections between individuals, groups, and access privileges are represented as edges in the graph, wherein selecting the analytic technique is based at least in part on attributes of the graph.

7. The method of claim 6, further comprising generating a visualization of the generated graph.

8. The method of claim 7, further comprising, for each of the nodes that represent a corresponding individual, scaling the node to have a size that is proportional to an individual score of the corresponding individual.

9. The method of claim 7, further comprising, for each of the nodes that represent a corresponding individual, rendering the node with a color that is selected based at least in part on an individual score of the corresponding individual.

10. The method of claim 1, further comprising:
    selecting one or more additional analytic techniques for analyzing the adjacency matrix; and
    applying the selected one or more additional analytic techniques, wherein determining the individual score for each of the plurality of individuals includes combining respective individual scores determined based on applying each of the selected analytic techniques.

11. The method of claim 10, wherein combining respective individual scores includes weighting the individual scores based on the applied analytic technique.

12. A computing system for identifying network security risks, comprising:
one or more processors; and
one or more computer-readable devices including instructions that, when executed by the one or more processors, cause performance of operations including:
receiving organization data that represents a plurality of individuals in an organizational hierarchy of an organization, wherein the organization data includes data that indicates, for each individual of the plurality of individuals, one or more groups to which the individual belongs;
for at least one of the groups, determining a group score that represents a criticality of the group within the organization;
receiving access privilege data that indicates, for each individual of the plurality of individuals, one or more access privileges that have been assigned to the individual for network resources;
for at least one of the access privileges, determining an access privilege score that represents an access privilege risk associated with potential misuse of the access privilege;
generating an adjacency matrix that represents connections between the plurality of individuals and the one or more groups, and that represents connections between the plurality of individuals and the one or more access privileges, wherein a connection between an individual and the at least one of the groups is associated with the determined group score, and a connection between the individual and the at least one of the access privileges is associated with the determined access privilege score;
selecting an analytic technique for analyzing the adjacency matrix;
based on applying the selected analytic technique, for each individual of the plurality of individuals, determining an individual score that represents a security risk associated with a network account of the individual;
determining, for a particular individual, that the individual score meets a predetermined threshold; and
in response to the determining that the individual score meets a predetermined threshold, automatically applying, by a security control processor, one or more security controls to the network account of the particular individual, wherein applying the one or more security controls includes triggering an endpoint device to log activity associated with the network account of the particular individual.

13. The computing system of claim 12, the operations further comprising modifying the generated adjacency matrix, wherein the modifying comprises:
for at least one of the one or more groups or access privileges:
replacing a star network for the group or access privilege with a mesh network between individuals associated with the group or access privilege; and
removing the group or access privilege from the adjacency matrix.

14. The computing system of claim 12, the operations further comprising:
generating a graph based on the adjacency matrix, wherein selecting the analytic technique is based at least in part on attributes of the graph; and
generating a visualization of the generated graph that displays individuals, groups, and access privileges represented in the adjacency matrix as nodes, and that displays connections between individuals, groups, and access privileges as edges.

15. A non-transitory computer-readable storage medium coupled to one or more processors and having instructions stored thereon which, when executed by the one or more processors, cause the one or more processors to perform operations comprising:
receiving organization data that represents a plurality of individuals in an organizational hierarchy of an organization, wherein the organization data includes data that indicates, for each individual of the plurality of individuals, one or more groups to which the individual belongs;
for at least one of the groups, determining a group score that represents a criticality of the group within the organization;
receiving access privilege data that indicates, for each individual of the plurality of individuals, one or more access privileges that have been assigned to the individual for network resources;
for at least one of the access privileges, determining an access privilege score that represents an access privilege risk associated with potential misuse of the access privilege;
generating an adjacency matrix that represents connections between the plurality of individuals and the one or more groups, and that represents connections between the plurality of individuals and the one or more access privileges, wherein a connection between an individual and the at least one of the groups is associated with the determined group score, and a connection between the individual and the at least one of the access privileges is associated with the determined access privilege score;
selecting an analytic technique for analyzing the adjacency matrix;
based on applying the selected analytic technique, for each individual of the plurality of individuals, determining an individual score that represents a security risk associated with a network account of the individual;
determining, for a particular individual, that the individual score meets a predetermined threshold; and
in response to the determining that the individual score meets a predetermined threshold, automatically applying, by a security control processor, one or more security controls to the network account of the particular individual, wherein applying the one or more security controls includes triggering an endpoint device to log activity associated with the network account of the particular individual.

16. The non-transitory computer-readable storage medium of claim 15, the operations further comprising modifying the generated adjacency matrix, wherein the modifying comprises:
for at least one of the one or more groups or access privileges:

replacing a star network for the group or access privilege with a mesh network between individuals associated with the group or access privilege; and removing the group or access privilege from the adjacency matrix.

17. The non-transitory computer-readable storage medium of claim 15, the operations further comprising:

generating a graph based on the adjacency matrix, wherein selecting the analytic technique is based at least in part on attributes of the graph; and generating a visualization of the generated graph that displays individuals, groups, and access privileges represented in the adjacency matrix as nodes, and that displays connections between individuals, groups, and access privileges as edges.

* * * * *

UNITED STATES PATENT AND TRADEMARK OFFICE
CERTIFICATE OF CORRECTION

PATENT NO. : 9,973,522 B2
APPLICATION NO. : 15/206005
DATED : May 15, 2018
INVENTOR(S) : Louis William DiValentin and Matthew Carver Page 1 of 1

It is certified that error appears in the above-identified patent and that said Letters Patent is hereby corrected as shown below:

On the Title Page

Column 1, (Notice:), Line 3, delete "0 days. days." and insert -- 0 days. --, therefor.

Signed and Sealed this
Eighteenth Day of September, 2018

Andrei Iancu
*Director of the United States Patent and Trademark Office*